(12) United States Patent
Marinucci et al.

(10) Patent No.: US 11,606,262 B2
(45) Date of Patent: Mar. 14, 2023

(54) MANAGEMENT OF A COMPUTING SYSTEM WITH MULTIPLE DOMAINS

(71) Applicant: International Business Machines Corporation, Armonk, NY (US)

(72) Inventors: Francesco Marinucci, Rome (IT); Aldo Bucossi, Rome (IT); Lucia Santucci, Albano Laziale (IT); Lorenzo Citarelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 16/678,289

(22) Filed: Nov. 8, 2019

(65) Prior Publication Data

US 2021/0144066 A1    May 13, 2021

(51) Int. Cl.
| | | |
|---|---|---|
| *H04L 41/142* | (2022.01) | |
| *H04L 43/045* | (2022.01) | |
| *H04L 41/5009* | (2022.01) | |
| *H04L 41/0813* | (2022.01) | |
| *H04L 43/08* | (2022.01) | |

(Continued)

(52) U.S. Cl.
CPC ........ *H04L 41/142* (2013.01); *H04L 41/0813* (2013.01); *H04L 41/5009* (2013.01); *H04L 43/045* (2013.01); *H04L 43/08* (2013.01); *H04L 67/75* (2022.05); *H04L 43/55* (2022.05)

(58) Field of Classification Search
CPC .............. H04L 41/142; H04L 41/0813; H04L 41/5009; H04L 43/045; H04L 43/08; H04L 67/36; H04L 41/5038

See application file for complete search history.

(56) References Cited

U.S. PATENT DOCUMENTS 6,148,337 A * 11/2000 Estberg ................. H04L 41/046
709/224
7,401,012 B1 * 7/2008 Bonebakker .......... H04L 43/045
703/2

(Continued)

OTHER PUBLICATIONS

"IBM Common Data Provider for zSystems V1.1.0 documentation", IBM, 1 page, retrieved from the internet on Oct. 11, 2019, <https://www.ibm.com/support/knowledgecenter/SSGE3R_1.1.0/welcome.html>.

(Continued)

*Primary Examiner* — Lance Leonard Barry
*Assistant Examiner* — Timothy Sowa
(74) *Attorney, Agent, or Firm* — Aaron N. Pontikos; Jared L. Montanaro

(57) ABSTRACT

A method, computer program product, and system are provided to identify a target computing system configured to operate in a plurality of service domains. The method, computer program product, and system also, for each service domain of the plurality of service domains: collect current values of: (i) a metric indicating success of the service domain, and (ii) one or more other collection metrics of the service domain; determine one or more predominant metrics from the one or more other collection metrics, based, at least in part, on a statistical regression between the current values of the metric indicating success and the one or more other collection metrics, the one or more predominant metrics being predominant in affecting the metric indicating success; and output an indication of the current values of the metric indicating success and the one or more predominant metrics.

17 Claims, 10 Drawing Sheets

(51) Int. Cl.
*H04L 67/75* (2022.01)
*H04L 43/55* (2022.01)

(56) References Cited

U.S. PATENT DOCUMENTS

| | | | |
|---|---|---|---|
| 7,752,301 B1 | 7/2010 | Maiocco | |
| 8,738,425 B1* | 5/2014 | Basu | G06Q 10/0637 |
| | | | 705/7.38 |
| 9,727,836 B2 | 8/2017 | Marchand | |
| 10,540,605 B2* | 1/2020 | Mermoud | H04L 41/142 |
| 2003/0110007 A1* | 6/2003 | McGee | G06F 17/15 |
| | | | 702/179 |
| 2007/0039049 A1 | 2/2007 | Kupferman | |
| 2013/0148525 A1* | 6/2013 | Cuadra | H04L 41/147 |
| | | | 370/252 |
| 2015/0341211 A1* | 11/2015 | Saha | H04W 24/02 |
| | | | 709/221 |
| 2017/0019795 A1* | 1/2017 | Takahashi | H04W 16/18 |
| 2017/0111233 A1* | 4/2017 | Kokkula | H04L 41/0823 |
| 2017/0140071 A1 | 5/2017 | Coates | |
| 2017/0251013 A1* | 8/2017 | Kirti | H04L 63/1441 |
| 2017/0279669 A1 | 9/2017 | Tapia | |
| 2018/0004634 A1 | 1/2018 | Brown | |
| 2018/0032940 A1 | 2/2018 | Trenchard | |
| 2018/0083995 A1* | 3/2018 | Sheth | H04L 63/1416 |
| 2018/0114126 A1* | 4/2018 | Das | G06F 3/0482 |
| 2018/0375886 A1* | 12/2018 | Kirti | H04L 63/104 |
| 2019/0036816 A1* | 1/2019 | Evans | H04L 43/04 |
| 2019/0082286 A1* | 3/2019 | Tata | H04W 4/38 |
| 2019/0289058 A1* | 9/2019 | Bhoj | H04L 43/0805 |
| 2019/0296993 A1* | 9/2019 | Subramoni | H04L 43/08 |
| 2020/0128047 A1* | 4/2020 | Biswas | H04L 63/102 |
| 2020/0326957 A1* | 10/2020 | Toal | G06F 11/3058 |
| 2020/0327434 A1* | 10/2020 | Maeser | H04L 41/5096 |
| 2021/0083926 A1* | 3/2021 | Costa | H04L 41/0893 |

OTHER PUBLICATIONS

"Operations Analytics for zSystems overview", IBM, 4 pages, retrieved from the internet on Oct. 11, 2019, <https://www.ibm.com/support/knowledgecenter/SS55JD_2.2.0/com.ibm.zosla.doc/topics/zla_overview.html>.

* cited by examiner

MANAGEMENT OF A COMPUTING SYSTEM WITH MULTIPLE DOMAINS

BACKGROUND

The present invention relates generally to the field of information technology, and more particularly to the management of computer systems.

The management of computing systems is a critical activity in modern organizations, as it directly affects their availability, performance, and capacity. Management is especially challenging in large computing systems with very complex structures, such as environments that include mainframes. Because mainframes provides high levels of power, reliability, availability, serviceability, and security, mainframes are commonly used to run software applications that are critical for the corresponding organization (for example, in bank environments).

Monitoring tools are available to help system administrators in managing the mainframe. The monitoring tools collect different metrics of the mainframe overtime, for example, measuring availability, performance and usage of its software/hardware resources. These metrics may then be used to detect critical conditions of the mainframe and to act accordingly.

SUMMARY

According to an aspect of the present invention, there is a method that identifies, by a control computing system, a target computing system configured to operate in a plurality of service domains. The method also, for each service domain of the plurality of service domains: collects, by the control computing system, current values of: (i) a metric indicating success of the service domain, and (ii) one or more other collection metrics of the service domain; determines, by the control computing system, one or more predominant metrics from the one or more other collection metrics, based, at least in part, on a statistical regression between the current values of the metric indicating success and the one or more other collection metrics, the one or more predominant metrics being predominant in affecting the metric indicating success; and outputting, by the control computing system, an indication of the current values of the metric indicating success and the one or more predominant metrics. Further aspects provide computer program products and a computer systems for implementing the method.

BRIEF DESCRIPTION OF THE DRAWINGS

The present disclosure, and the features and advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

Figure 1A:
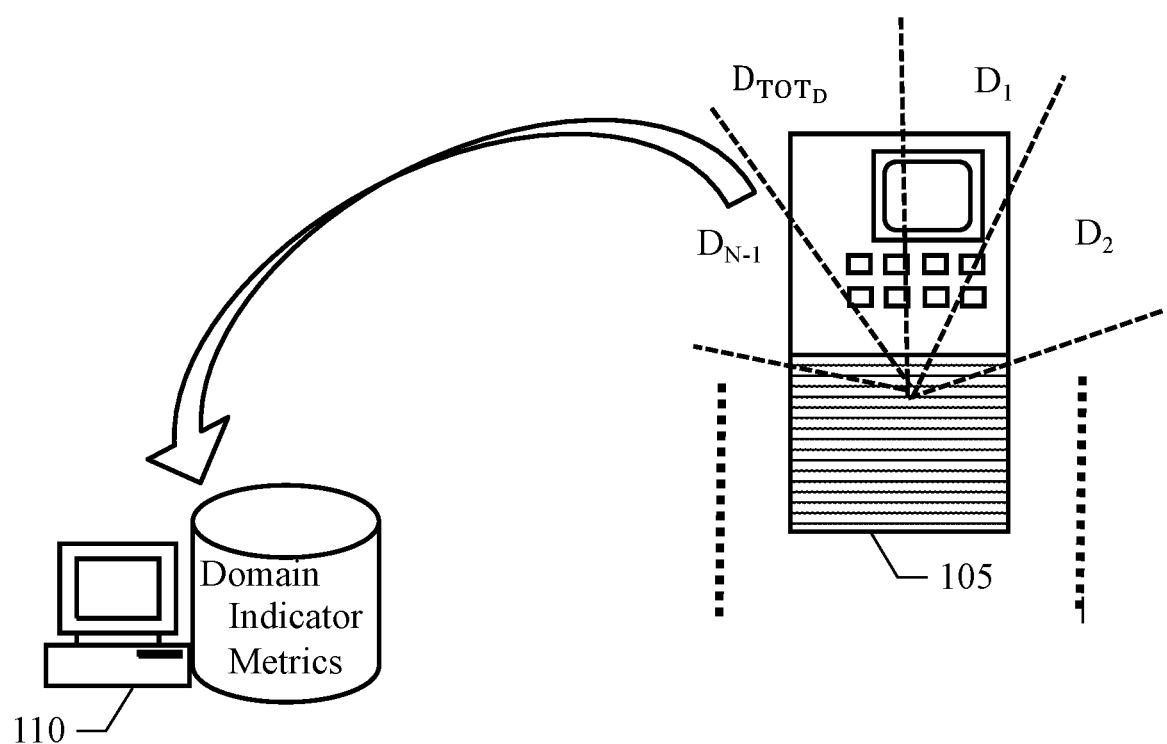
FIGS. 1A, 1B, and 1C depict general principles of a solution, according to an embodiment of the present invention.

Embodiments of the present invention recognize that when operative requirements of software applications running on a mainframe are established at a business level in an organization, their translation to a technical level in the mainframe can be quite difficult. This is exacerbated by the high dynamicity of the market that requires more and more rapid changes to software applications, thereby reducing the time available to manage the mainframe accordingly.

Further, budget constraints very often limit the number of system administrators that are dedicated to manage the mainframe (from its availability, performance, and capacity point of view). Moreover, system administrators are difficult to replace. Indeed, a learning curve for becoming system administrators of the mainframe can be quite steep, so that several years of training are needed to reach the required expertise. This creates a skill gap that makes it difficult to recruit system administrators that are sufficiently competent.

Monitoring tools are available to help system administrators in managing the mainframe. However, these monitoring tools typically provide an enormous amount of data that is quite difficult to interpret. Moreover, the determination of the root cause of any critical condition is mainly a manual activity, which strongly depends on the skill of the system administrators (often relying purely on intuition and experience), and as such can be prone to errors, far from optimal, and scarcely reproducible.

In addition, the mainframe is generally organized into multiple service domains that handle specific aspects of its operation. For example, the service domains can relate to functionalities of storage, networking, messaging, transactions, databases, and web servers. The management of the different service domains may then be assigned to corresponding system administrators. As a result, it is possible to break down the complexity of the mainframe and to exploit a specific expertise for each service domain.

This results in a fundamentally siloed approach to the management of the mainframe, wherein each system administrator has a vision exclusively for the system administrator's corresponding service domain. As a result, the high specializations of the system administrators make it difficult for any cooperation among them (because of the lack of expertise of each system administrator in the other service domains). This is further exacerbated by the commonplace use of different terms in the service domains for referring to the same resources of the mainframe.

However, service domains are not always completely isolated from each other. Indeed, service domains share common resources of the mainframe (for example, at a level of an operating system). Moreover, hidden relationships exist among their operations. Therefore, whenever a system administrator acts on the mainframe in an attempt to solve a critical condition of the corresponding service domain, this may impact other service domains (without any awareness of the system administrator), with the risk of creating additional critical conditions therein.

This increases the time required to solve any critical conditions of the mainframe. It may involve very high economic losses to the corresponding organization, especially when the critical conditions do not allow compliance with Service Level Agreements (SLAs) that are to be met by the software applications running on the mainframe.

Moreover, this makes it difficult to predict the critical conditions before their occurrences, and particularly to identify the reasons that may lead to them. As a result, in many cases it is not possible to act proactively on the mainframe to prevent the critical conditions. This is especially serious when the critical conditions are very costly or even catastrophic for the organization.

Figure 1B:
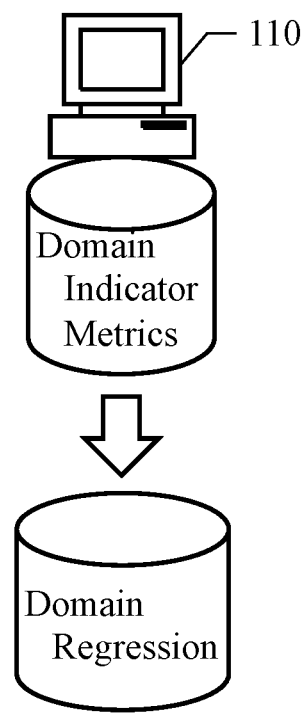
Figure 1C:
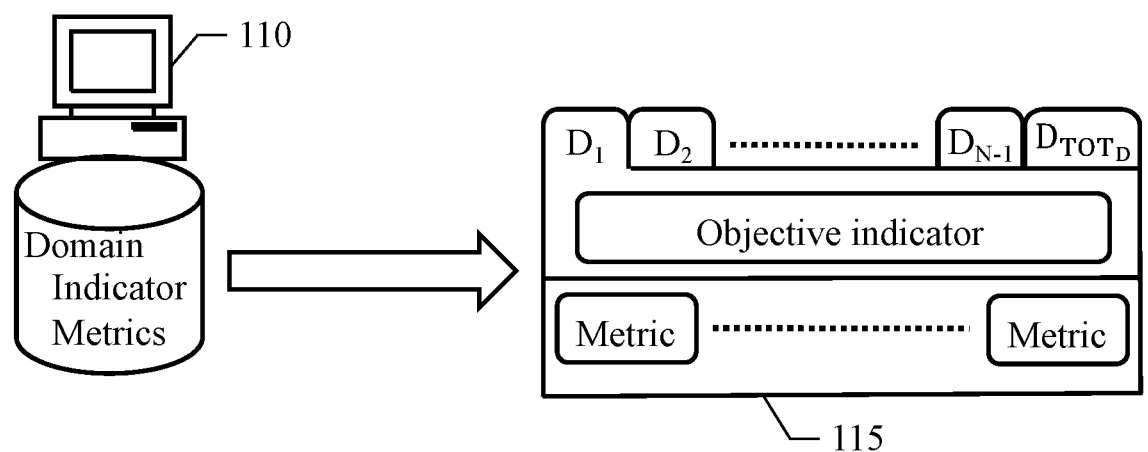

With reference in particular to FIGS. 1A-1C, general principles of a solution according to an embodiment of the present invention will now be described.

Starting from FIG. 1A, a target computing system, for example, mainframe 105, is managed by a plurality of system administrators (not depicted). Typical characteristics of mainframe 105 are high computational power, large storage capacity, large memory space, redundant architecture, extensive I/O capacity, strict backward compatibility, hot-swapping capability, and so on (providing high levels of power, reliability, availability, serviceability, and/or security). Mainframe 105 is specifically designed to process transactions (i.e., operations that are required to succeed or fail as a complete unit individually). This makes mainframe 105 well suited to run software applications (performing specific tasks for end users) that are critical for a corresponding organization (for example, in bank, insurance, accounting, reservations, traffic control and so on environments).

The management of mainframe 105 relates to its hardware and/or software resources. This involves optimizing the allocation of existing resources and/or the provisioning of new resources with respect to one or more operative objectives of mainframe 105. For example, the operative objectives relate to the availability, performance, and/or capacity of mainframe 105. In many cases, the operative objectives are defined by a Service Level Agreement (SLA), which specifies target values of one or more operative parameters of mainframe 105 to be met.

Mainframe 105 is organized into a plurality of service domains $D_i$, with i=1 ... $TOT_D$ (handling specific aspects of its operation). Each service domain is managed by a corresponding system administrator, or more, having a specific expertise on the service domain (and generally having a very poor expertise on the other service domains). For example, the service domains may be defined by an operating system (running directly on the hardware of mainframe 105 to define a software platform on top of which any other software programs may run) and/or by corresponding middlewares (software programs providing services to the software applications, beyond those provided by the operating system). For example, the service domains provide functionalities of storage (facilitating I/O operations), networking (implementing telecommunications), messaging (allowing communications among software applications), transactions (ensuring operation's integrity), databases (supporting relational/hierarchical organizations of data), web servers (serving requests in the Internet) and so on.

One or more control computing systems, for example, workstation(s) 110, are used by corresponding system administrators to control the management of mainframe 105. Particularly, each system administrator uses workstation 110 to manage the corresponding service domain. For this purpose, (current) values of a plurality of (collection) metrics for each service domain are collected (for example, continually over time). In each service domain, a collection metric (or more) is selected as an objective indicator (also known as Performance Key Indicator (PKI), domain indicator metric, or metric indicating success) of the service domain. The objective indicator defines the operative objective of the service domain to be met. For example, the objective indicator specifies an operative parameter that is required to be maintained below/above a corresponding objective threshold.

Moving to FIG. 1B, in a solution according to an embodiment of the present invention, (current) versions of a statistical domain regression are determined among the collection metrics and the objective indicator of each service domain (for example, continually over time), according to their values that have been collected at workstation 110. The statistical regression provides an estimate of a relationship indicating how the objective indicator (dependent variable) changes as one or more predominant (collection) metrics change (independent variables). The predominant metrics are the ones that are predominant in affecting the objective indicator (i.e., they have the strongest relationship with it).

Moving to FIG. 1C, an indication is output of the (current) values of the objective indicator and of the (current versions of the) predominant metrics of each service domain. For example, monitoring dashboard 115 is generated and displayed on workstation 110. In the specific graphical implementation shown in the figure, monitoring dashboard 115 is implemented as a tabbed pane. The tabbed pane comprises a stack of (overlaying) panels with (selection) tabs corresponding to the service domains. Only an (active) panel that is selected via its tab (for the service domain $D_1$ in the figure) is visible on top of the stack (whereas all the other panels are covered by it). The active panel shows the values of the objective indicator and of the predominant metrics of the service domain $D_1$ with corresponding widgets (such as bar charts, speedometer charts and so on).

This information may then be used by the system administrators to manage the corresponding service domains. Particularly, whenever the value of the objective indicator of any (critical) service domain becomes critical (for example, because it reaches the corresponding objective threshold), the system administrator may act on an adjusting (predominant) metric, or more, of the critical service domain in an attempt to restore its correct operation.

The information provided to the system administrators significantly simplifies the management of mainframe 105. Indeed, each system administrator is now provided with the values of only a relatively low number of predominant metrics (which have the strongest relationship with the objective indicator of the corresponding service domain). Moreover, this information self-adapts dynamically to the changing conditions of mainframe 105.

As a result, the system administrators may easily identify the adjusting metric that is likely to relate to the root cause of the critical condition of any critical service domain (and then a corresponding area of intervention thereon). This makes the process less dependent on the skill of the system administrators (and especially on their intuition and experience) and then less prone to errors, more streamlined, and more reproducible, even when the system administrators have a relatively poor expertise.

The above-mentioned solution reduces the time required to solve any critical conditions of the mainframe. Moreover, this facilitates the prediction of the critical conditions before their occurrences, so as to allow acting proactively on mainframe 105 for preventing them. This limits possible economic losses to the corresponding organization, especially reducing the risks that any SLAs are not met.

With reference now to FIGS. 2A-2E, general principles of a solution according to an embodiment of the present invention will now be described.

Figure 2A:
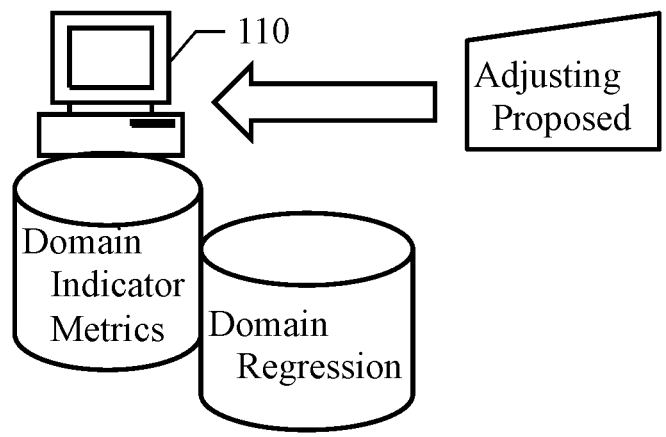
FIGS. 2A, 2B, 2C, 2D and 2E depict general principles of a solution, according to an embodiment of the present invention.

Starting from FIG. 2A, the system administrator of the critical service domain may also simulate the effect of any correction action thereon before its actual application. For this purpose, a proposed value of the adjusting metric is entered at workstation 110 (for example, acting on the corresponding widget, see FIG. 1C).

Figure 2B:
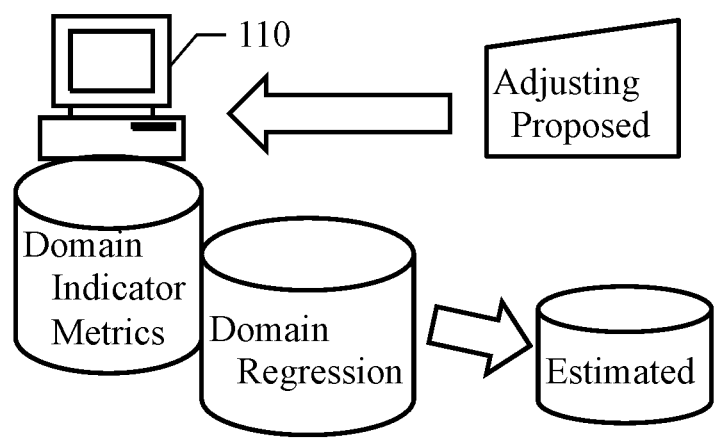

Moving to FIG. 2B, an estimated value of the objective indicator is calculated. The estimated value is calculated according to the last version of the statistical regression, by applying it to the proposed value of the adjusting metric and to the last value of the other predominant metrics of the critical service domain, collected at workstation 110.

Figure 2C:
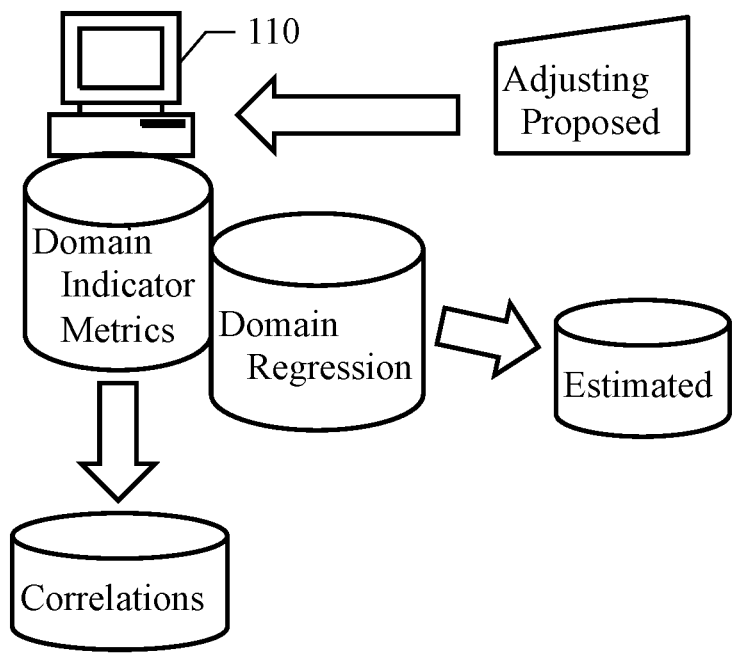

Moving to FIG. 2C, a statistical correlation is also determined between the adjusting metric and each predominant metric of all the service domains, according to their values that have been collected at workstation 110. The statistical correlations provide an estimate of how the predominant metrics depend on the adjusting metric.

Figure 2D:
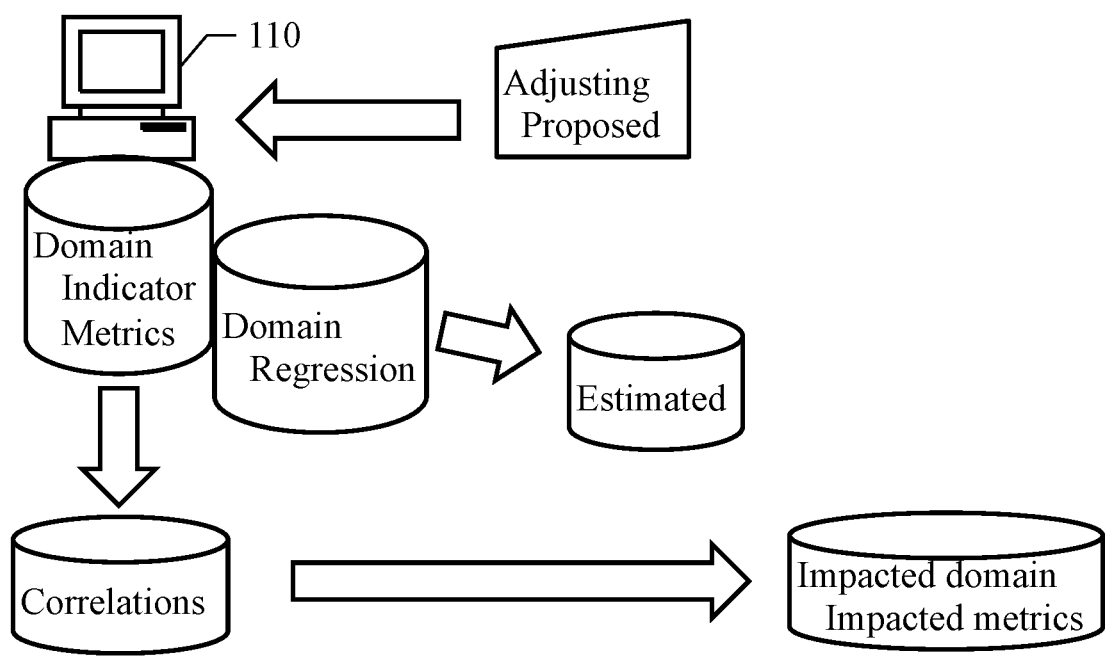

Moving to FIG. 2D, one or more impacted (predominant) metrics are determined among the predominant metrics collected at workstation 110. The impacted metrics are determined according to the corresponding statistical correlations with the adjusting metric, as the ones that are most correlated thereto (i.e., they most depend on it). One or more impacted service domains are then determined among all the other service domains different from the critical service domain. The impacted service domains are determined as the ones that have one or more of the impacted metrics comprised in their predominant metrics (so that their objective indicators depend on the adjusting metric as well).

Figure 2E:
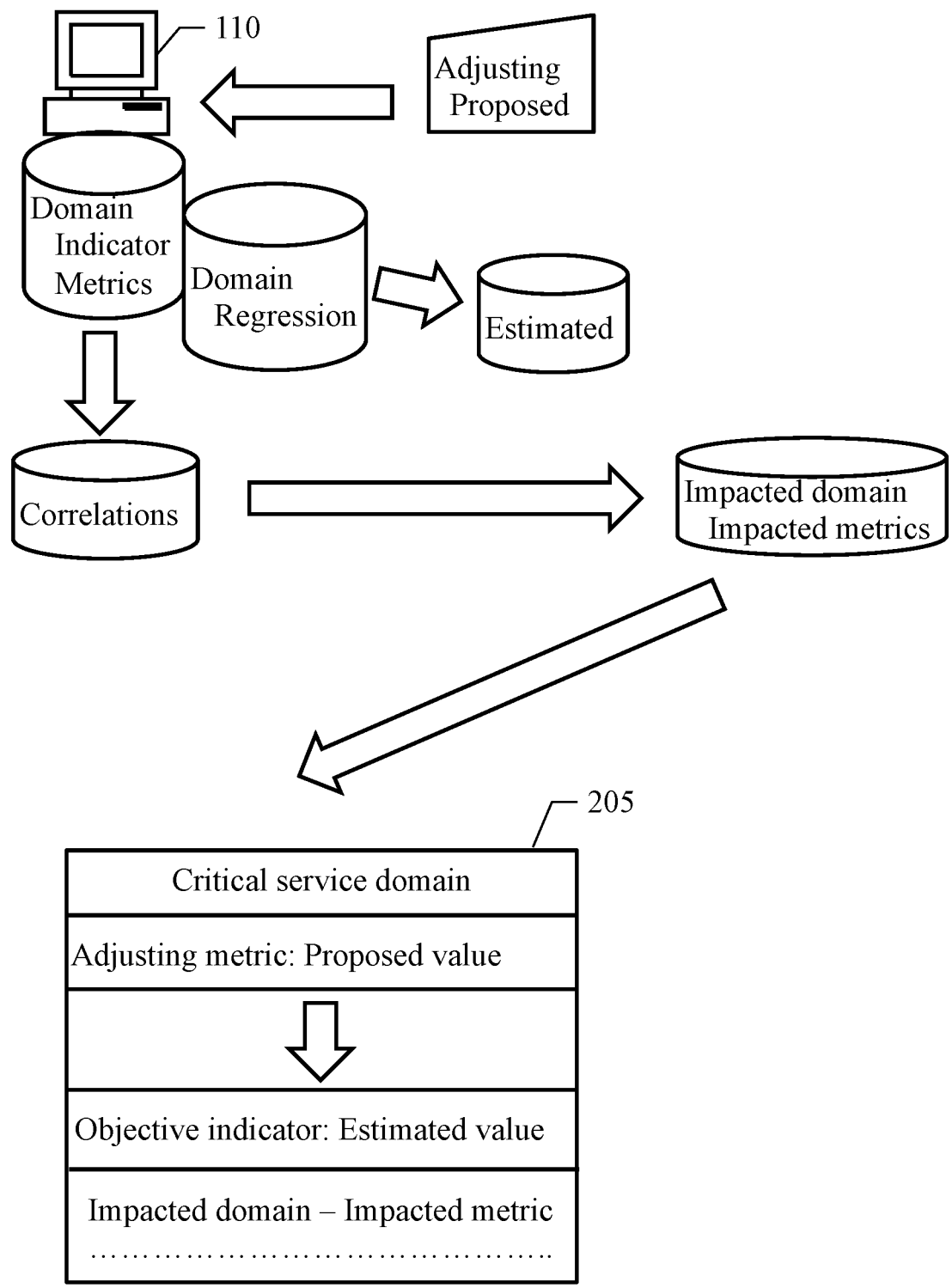

Moving to FIG. 2E, an indication is output of the estimated value of the adjusting metric, of the impacted service domains, and of their impacted metrics. For example, simulation dashboard 205 is created and displayed on workstation 110. In the specific graphical implementation shown in the figure, simulation dashboard 205 is implemented as a pop-up window. The pop-up window shows, for the critical service domain, the adjusting metric and its proposed value (input data). The pop-up window then shows the estimated value of the objective indicator, the impacted service domains, and their impacted metrics (output data).

This information may then be used by the system administrator of the critical service domain to verify the effect of the correction action corresponding to the proposed value of the adjusting metric before its actual application. Particularly, the estimated value of the objective parameter allows the system administrator to forecast how the correction action is actually effective in restoring the correct operation of the critical service domain. Moreover, the affected service domains (with their affected metrics) allow the system administrator to forecast any impact of the correction action on the other service domains. This result is achieved without requiring any expertise of the system administrator of the critical service domain on the other service domains.

The aforementioned fosters a collaborative approach among the system administrators. This significantly improves the results that may be achieved at a global level for the whole mainframe.

Figure 3:
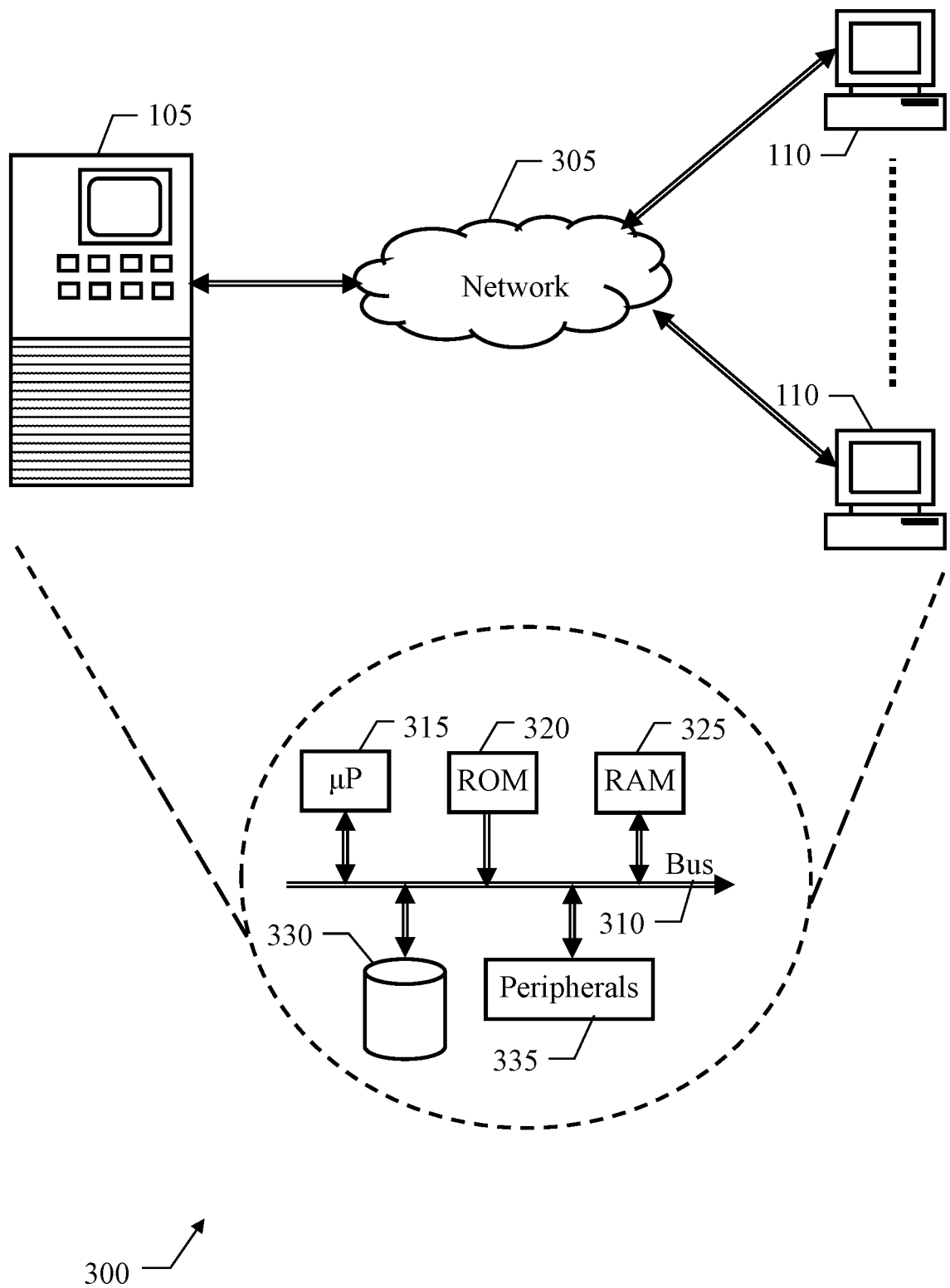
FIG. 3 depicts a schematic block diagram of an information technology infrastructure wherein a solution, according to an embodiment of the present invention may be practiced.

With reference now to FIG. 3, a schematic block diagram of information technology infrastructure 300 is shown, wherein a solution according to an embodiment of the present invention may be practiced.

Information technology infrastructure 300 comprises the above-mentioned mainframe 105 and workstation(s) 110 (collectively called computers 105-110). Computers 105-110 communicate over network 305 (for example, a LAN of the corresponding organization).

Each of computers 105-110 comprises several units that are connected among them through bus structure 310 at one or more levels (with an architecture that is suitably scaled according to the type of the computer 105-110). Particularly, microprocessor(s) (µP) 315 control operation of computers 105-110, non-volatile memory (ROM) 320 stores basic code for a bootstrap of computers 105-110, and volatile memory (RAM) 325 is used as a working memory by microprocessors 315. Computers 105-110 are provided with mass-memory 330 for storing programs and data (for example, one or more hard disks). Moreover, computers 105-110 comprise a number of controllers for peripherals, or Input/Output (I/O) units, 335. For example, peripherals 335 comprise a keyboard, a mouse, a monitor, a network adapter (NIC) for connecting to network 305, and a drive for reading/writing removable storage units, such as optical disks like DVDs.

Figure 4:
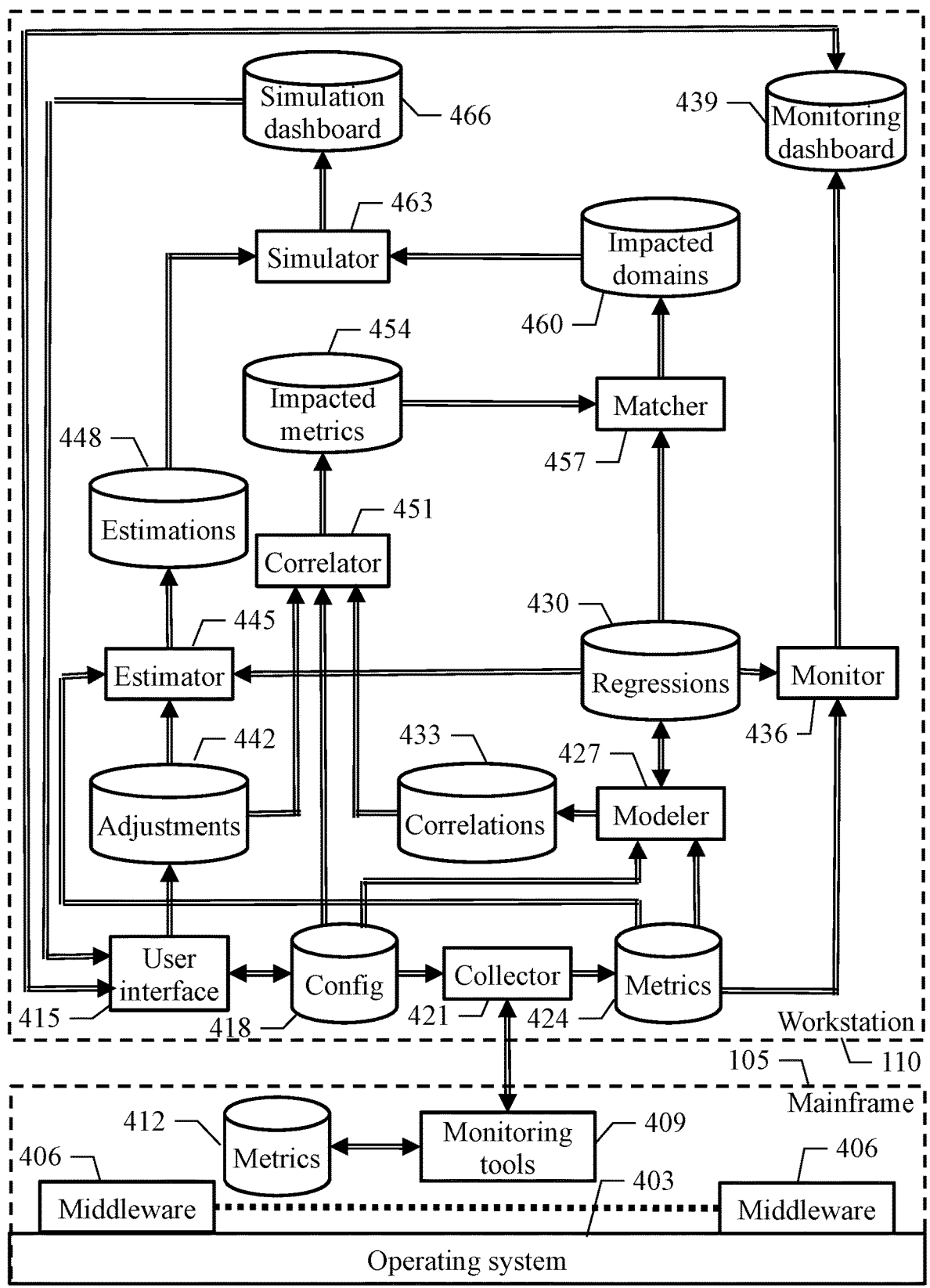
FIG. 4 depicts software components that may be used to implement a solution, according to an embodiment of the present invention.

With reference now to FIG. 4, software components that may be used to implement a solution according to an embodiment of the present disclosure will now be described.

Particularly, software components (programs and data) are denoted as a whole with the reference 400. Software components 400 are typically stored in mass memory and loaded (at least in part) into the working memory of computers 105-110 when the programs are running. The programs are initially installed into mass memory, for example, from removable storage units or from the network (not shown in the figure). In this respect, each program may be a module, segment, or portion of code, which comprises one or more executable instructions for implementing the specified logical function.

Starting from mainframe 105, software components 400 comprise the following components.

Operating system 403 (running on the hardware of mainframe 105) and middlewares 406 (running on operating system 403) define corresponding service domains of mainframe 105. One or more monitoring tools 409 (running either on operating system 403 or on middlewares 406) monitor hardware and/or software resources of mainframe 105 by continually collecting (available) metrics thereof. For example, these resources comprise processors, storage devices, volatile memory, peripheral devices, network devices, processing power, memory space, virtual memory, I/O bandwidth, communication channels, and so on. The available metrics may comprise average response time, average throughput, suspensions for latches/locks, transaction rate, transaction volume, task number, processing power usage, working memory usage, storage usage, paging rate, I/O rate, active channels, and so on. Monitoring tools 409 access (in read/write mode) corresponding metric repositories 412. Each metric repository 412 logs the values of the available metrics that have been collected by the corresponding monitoring tool 409 over time. For example, metric repository 412 comprises an entry for each collection time (indicated by a corresponding timestamp). The entry stores a (unique) name of the available metric and its value that has been collected.

Moving to each workstation 110 (only one shown in the figure), workstation 110 runs a management software application for managing mainframe 105 by its system administrators. The management software application comprises the following components.

User interface 415 (with a corresponding driver for the monitor of workstation 110) is used by the system administrators to interact with the management software application. Particularly, the system administrators may utilize user interface 415 to configure the management software application. For example, each system administrator may select the collection metrics to be collected for the corresponding service domain (starting from a default set thereof). The collection metrics are selected among all the available metrics (which may be provided by monitoring tools 409). Moreover, the system administrator may set one of the collection metrics (or more) as the objective indicator of the service domain (for example, best defining its availability, performance, and/or capacity). User interface 415 accesses (in read/write mode) configuration repository 418. Configuration repository 418 defines the configuration of the management software application. For example, configuration repository 418 comprises an entry for each available metric that may be provided by monitoring tools 409 (identified by its name). The entry stores instructions for collecting the available metric from the corresponding monitoring tool 409 (for example, its network address and a collection command to be submitted thereto for this purpose). Moreover, configuration repository 418 comprises an entry for each service domain (identified by a corresponding unique name). The entry lists the collection metrics to be collected for the service domain (identified by their names). Each collection metric is associated with a type indicator and an objective flag. The type indicator specifies a type of the collection metric. Particularly, the collection metric may be intra-domain when it is relevant to the operation of the corresponding service domain only or it may be cross-domain when it is relevant to the operation of one or more other service domains as well (typical of the collection metrics of operating system 403). The objective flag indicates whether the collection metric is the objective indicator of the service domain (when asserted). Collector 421 continually collects the (current) values of the collection metrics. For this purpose, collector 421 interacts with monitoring tools 409. Collector 421 accesses (in read mode) configuration repository 418 and it accesses (in write mode) metric repository 424. Metric repository 424 logs the values of the collection metrics that have been collected over time. For example, metric repository 424 comprises an entry for each collection metric (identified by its name). The entry stores the most recent values of the collection metric that have been collected (for example, in the last year).

Modeler 427 determines the statistical regressions and the statistical correlations. Particularly, for each service domain modeler 427 determines its statistical regression as a linear regression function. The (linear) regression function expresses the objective indicator as a linear combination of regression parameters of the predominant metrics of the service domain. In the simplest case, wherein the regression function is linear in the predominant metrics as well, the regression function is defined as:

$$I = p_0 + \sum_{i=1}^{TOT_M} p_i \cdot M_i,$$

wherein I is the objective indicator, $M_i$ are the predominant metrics, $TOT_M$ is the total number of the predominant metrics and $p_o, p_i$ are the regression parameters. Moreover, modeler 427 determines the statistical correlations as a correlation matrix. The correlation matrix indicates a linear correlation coefficient for one or more pairs of predominant metrics. For example, the (linear) correlation coefficient is the Pearson's coefficient, ranging from −1 for a perfect negative linear correlation to +1 for a perfect positive linear correlation, with 0 for no linear correlation. Modeler 427 accesses (in read mode) configuration repository 418 and metric repository 424, and it accesses (in read/write mode) regression function repository 430 and (in write mode) correlation matrix repository 433. Regression function repository 430 defines the regression functions. For example, regression function repository 430 comprises an entry for each service domain (identified by its name). The entry stores a specification of the last versions (corresponding to the values of the collection metrics in the corresponding repository 424) of the regression function of the service domain (for example, in the PMML format) and corresponding values of an accuracy indicator thereof. Correlation matrix repository 433 stores the current version of the correlation matrix.

Monitor 436 generates the monitoring dashboard. Monitor 436 accesses (in read mode) metric repository 424 and regression function repository 430, and it accesses (in write mode) monitoring dashboard repository 439. Monitoring dashboard repository 439 defines the monitoring dashboard. For example, monitoring dashboard repository 439 comprises an entry for each service domain (identified by its name). The entry stores the current values of the objective indicator and of the current version of the predominant metrics of the service domain, and the value of the accuracy indicator of the current version of the regression function.

User interface 415 may also be utilized by the corresponding system administrators to simulate possible actions on any critical service domains (whose objective indicators have become critical). For example, each system administrator may select the adjusting metric and then enter its proposed value. User interface 415 further accesses (in write mode) adjustment repository 442. Adjustment repository 442 defines any adjustments being proposed for the critical service domains. For example, adjustment repository 442 comprises an entry for each critical service domain (identified by its name). The entry stores the name of the adjustment metric and its proposed value. Estimator 445 calculates the estimated values of the objective indicators of the critical service domains. Estimator 445 accesses (in read mode) adjustment repository 442 and regression function repository 430, and it accesses (in write mode) estimation repository 448. Estimation repository 448 defines these estimates. For example, estimation repository 448 comprises an entry for each critical service domain (identified by its name). The entry stores the estimated value of the objective indicator of the critical service domain.

Correlator 451 determines the impacted metrics (being impacted by the adjusting metrics). Correlator 451 accesses (in read mode) configuration repository 418, correlation matrix repository 433, and adjustment repository 442, and it accesses (in write mode) impacted metric repository 454. Impacted metric repository 454 indicates the impacted metrics. For example, impacted metric repository 454 comprises an entry for each critical service domain (identified by its name). The entry lists the names of the impacted metrics corresponding to the adjusting metric of the critical service domain. Matcher 457 determines the impacted service domains (being impacted by the adjusting metrics). Matcher 457 accesses (in read mode) regression function repository 430 and impacted metric repository 454, and it accesses (in write mode) impacted service domain repository 460.

Impacted service domain repository 460 indicates the impacted service domains. For example, impacted service domain repository 460 comprises an entry for each critical service domain (identified by its name). The entry lists the names of the impacted service domains corresponding to the adjusting metric of the critical service domain. For each impacted service domain, the entry lists the names of its impacted metrics.

Simulator 463 generates the simulation dashboard. Simulator 463 accesses (in read mode) estimation repository 448 and impacted service domain repository 460, and it accesses (in write mode) simulation dashboard repository 466. Simulation dashboard repository 466 defines the simulation dashboard. For example, simulation dashboard repository 466 comprises an entry for each critical service domain (identified by its name). The entry stores an estimated variation of the objective indicator of the critical service domain (in percentage) given by the estimated value together with a corresponding accuracy indicator, and it lists the names of the corresponding impacted service domains with the names of their impacted metrics.

User interface 415 further displays the monitoring dashboard and the simulation dashboard. For this purpose, user interface 415 accesses (in read mode) monitoring dashboard repository 439 and simulation dashboard repository 466.

Figure 5A:
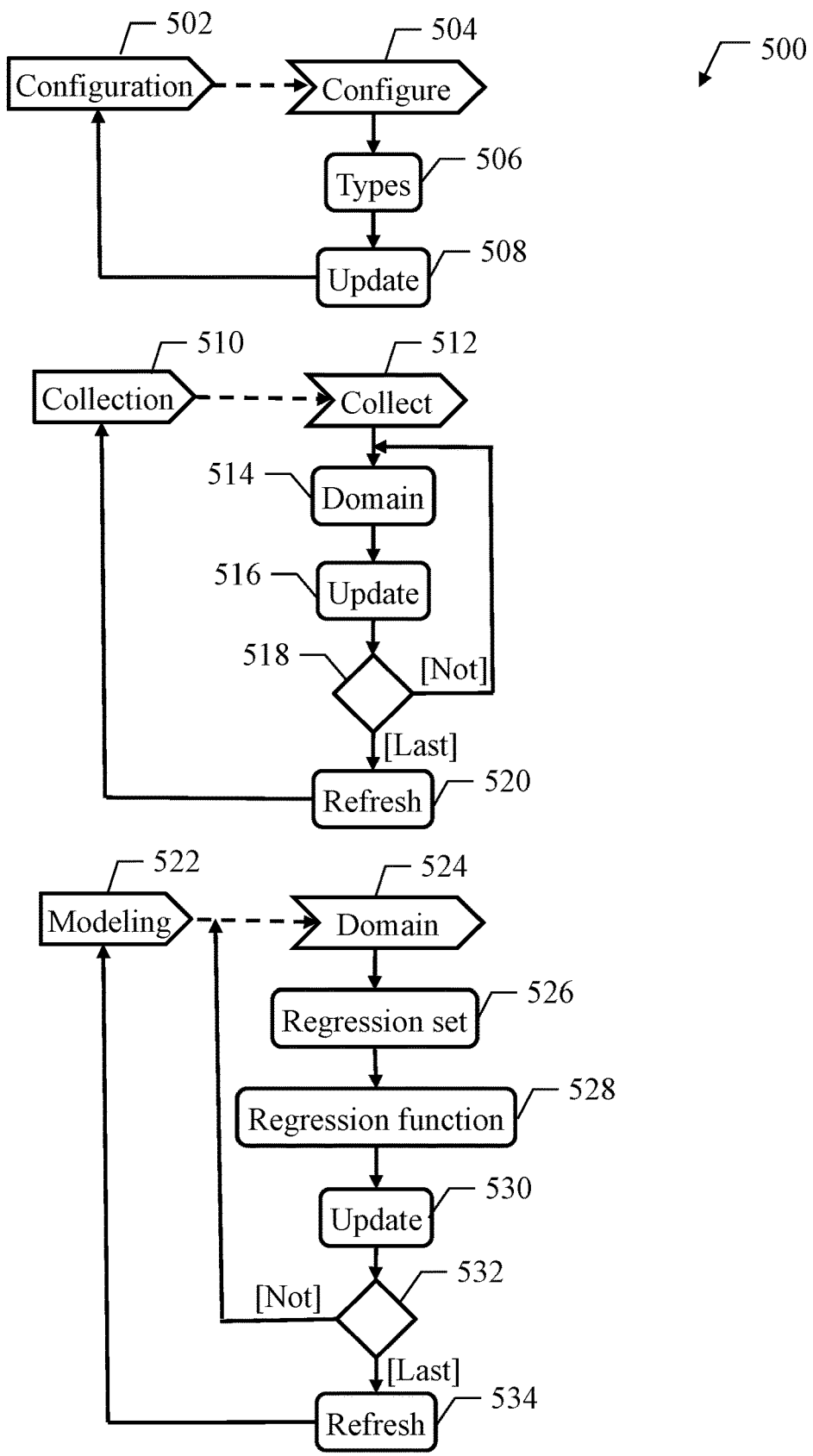
FIGS. 5A, 5B, and 5C depict portions of a flowchart relating to an implementation of a solution according to an embodiment of the present invention.
Figure 5B:
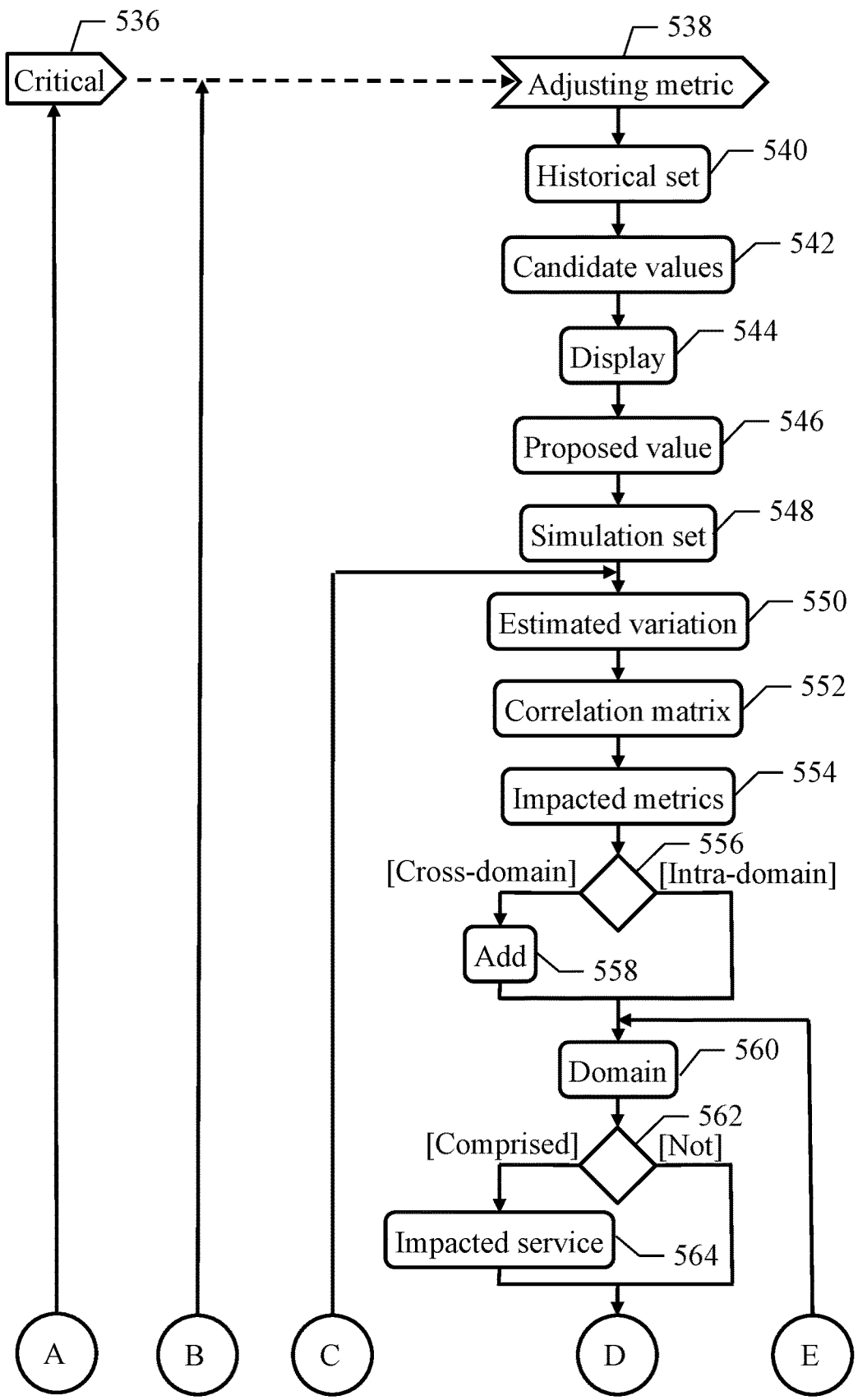
Figure 5C:
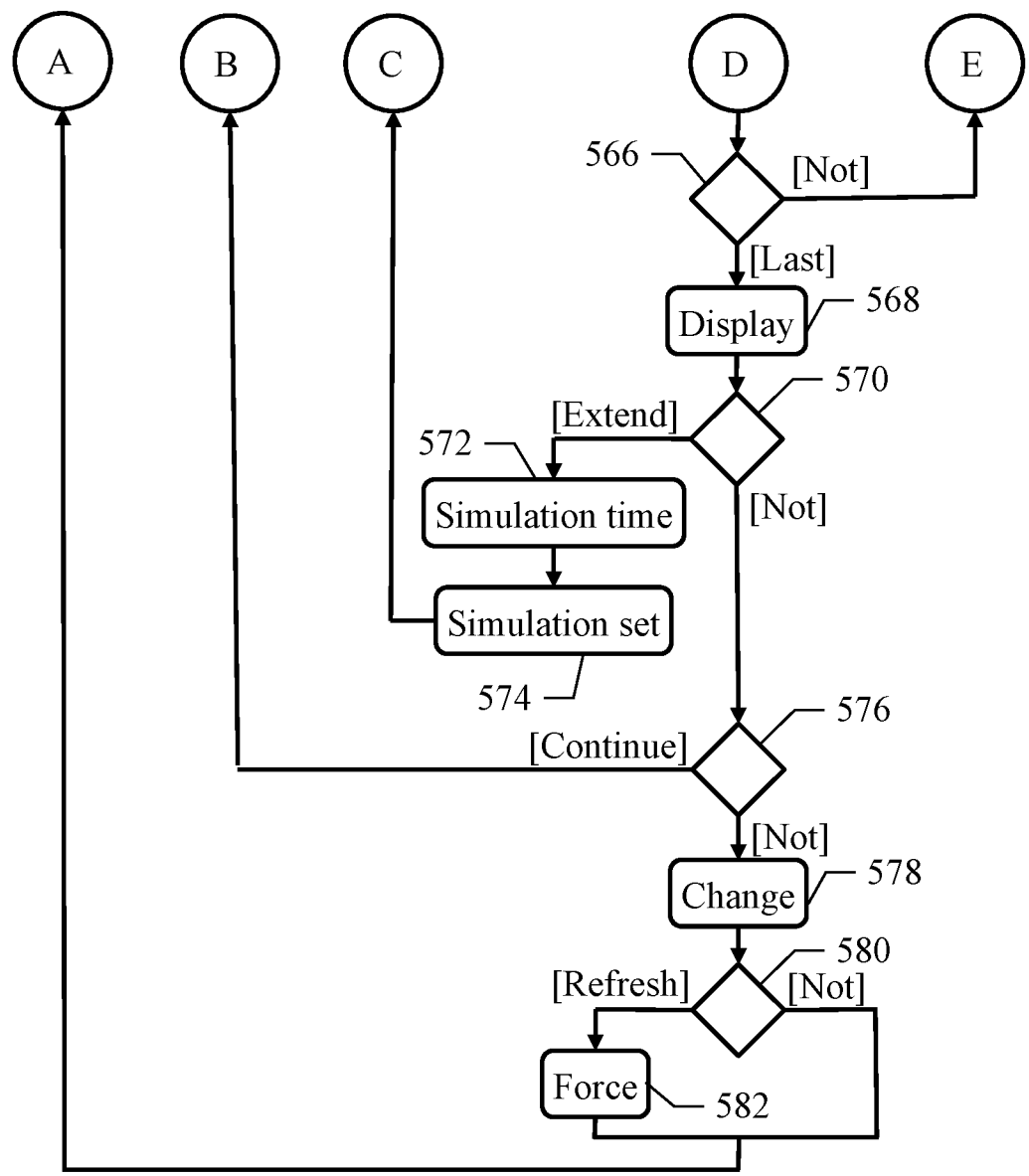

With reference now to FIGS. 5A-5C, portions of a flowchart are shown describing a flow of activities relating to an implementation of a solution according to an embodiment of the present invention.

Particularly, the flowchart represents an exemplary process, method 500, that may be used to manage the mainframe. In this respect, each block may correspond to one or more executable instructions for implementing the specified logical function on each workstation.

The process passes from block 502 to block 504 as soon as any system administrator submits a command to the user interface for configuring the management software application with respect to its service domain (for example, by authenticating and then selecting a corresponding menu option). In response thereto, the user interface displays the names of the available metrics (which may be provided by the monitoring tools) and the (current) configuration for the service domain (i.e., the names of its collection metrics and objective indicator), and it allows the system administrator to customize the latter (for example, with a drag and drop technique). Once the system administrator has confirmed the (new) configuration of the service domain, the user interface at block 506 parses the configuration repository to re-determine the type of each collection metric; particularly, the collection metric is intra-domain when it is comprised in the entry of a single service domain, whereas it is cross-domain when it is comprised in the entries of two or more service domains. The user interface at block 508 updates the configuration repository accordingly. The process then returns to block 502 waiting for a next request of configuring the management software application.

In a completely independent manner, the process passes from block 510 to block 512 every time a collection period expires (for example, set to a default value, such as every hour, with the possibility of customizing it). In response thereto, the collector retrieves the network address of the corresponding monitoring tool and the collection command of each collection metric (to be collected for one or more service domains) from the configuration repository. The collector then submits the collection commands to the network addresses of the monitoring tools (possibly consolidated for each of them). As the collector receives the (current) values of the collection metrics from the corresponding monitoring tools, it updates the metric repository accordingly. Once the values of all the collection metrics have been received (and in any case after a pre-defined time-out), a loop is entered at block 514, wherein the monitor takes a (current) service domain into account, starting from a first one in any arbitrary order (as indicated in the regression function repository). The monitor at block 516 retrieves the just collected value of the predominant metrics and of the objective indicator of the service domain (as indicated by its regression function in the corresponding repository) from the metric repository, and it updates the monitoring dashboard accordingly in the corresponding repository. A test is made at block 518, wherein the monitor verifies whether a last service domain has been taken into account. If not, the flow of activity returns to block 514 to repeat the same operations on a next service domain. Conversely (once all the service domains have been taken into account), the loop is exited, descending into block 520. At this point, the user interface refreshes the monitoring dashboard to display its new version (as defined in the corresponding repository) on the monitor of the workstation. The process then returns to block 510 waiting for a next expiration of the collection period.

In a completely independent manner, the process passes from block 522 to block 524 every time a modeling period expires. The modeling period is strictly longer than the collection period (for example, set to a default value, such as every month, with the possibility of customizing it), so as to ensure that the number of values of each predominant metric that have been collected since a last expiration thereof is statistically significant (for example, 500-5000). In response thereto, a loop is entered, wherein the modeler takes a (current) service domain into account, starting from a first one in any arbitrary order (as indicated in the configuration repository). The modeler at block 526 retrieves a regression set of values of the collection metrics and of the objective indicator of the service domain (as indicated in the configuration repository) from the metric repository. The values of the regression set are the last ones that have been collected since a previous expiration of the modeling period. The modeler at block 528 determines a new version of the regression function of the service domain according to the values in the regression set. For example, the regression function is determined with a stepwise method, which involves an iterative process wherein at each iteration the regression function is changed by a single collection metric. Particularly, a forward stepwise method starts from no collection metric and adds a (predominant) collection metric at each iteration, wherein a backward stepwise method starts from all the collection metrics and removes a (non-predominant) collection metric at each iteration. The collection metric to be added/removed is selected as the one that best improves an accuracy indicator of the regression function in predicting the objective indicator (determined via an F-test). For example, the accuracy indicator is defined by the R-squared coefficient (in percentage relative to the objective indicator, with the higher the R-squared coefficient the higher the accuracy of the regression function). At each iteration, a new version of the statistical function (with one more or less collection metric) is then determined, together with its regression parameters (via corresponding T-tests). The iterative process is stopped as soon as the addition/removal of any collection metric provides no significant change (improvement/deterioration) in the accuracy of the regression function. The modeler then updates the regression function repository accordingly. The monitor at block 530 accordingly updates (in the corresponding repository) a layout of the monitoring dashboard, with number and size of the widgets for the predominant metrics that change according to them (from the regression function repository) and it refreshes the values of the (new) predominant metrics and of the accuracy indicator of the corresponding regression function (from the metric repository). A test is made at block 532, wherein the modeler verifies whether a last service domain has been taken into account. If not, the flow of activity returns to block 524 to repeat the same operations on a next service domain. Conversely (once all the service domains have been taken into account), the loop is exit by descending into block 534. At this point, the user interface refreshes the monitoring dashboard to display its new version (as defined in the corresponding repository) on the monitor of the workstation. The process then returns to block 522 waiting for a next expiration of the modeling period.

In a completely independent manner, the process passes from block 536 to block 538 every time any system administrator detects that its (critical) service domain has entered a critical condition because the objective indicator has reached the corresponding objective threshold (i.e., the objective indicator has become, possibly strictly, higher or lower than the objective threshold). For example, the monitor normally generates the monitoring dashboard with the objective indicators set to a certain color (such as green) for their display by the user interface, and it switches to another color (such as red) when any objective indicator reaches the objective threshold (with the possibility of sending an alert message, such as via instant message or e-mail, to the corresponding system administrator as well). This helps the system administrators in identifying the critical conditions promptly. In response thereto, the system administrator of any critical service domain selects an adjusting metric (or more) among the predominant metrics thereof in the monitoring dashboard (for example, by double clicking on its widget). Particularly, because the predominant metrics are strictly correlated with the objective indicator, when the objective indicator exhibits a significant variation leading it to reach the objective threshold, it is very likely that the (adjusting) predominant metric that has caused it exhibits a significant variation as well. For example, in this case the monitor normally generates the monitoring dashboard with the predominant metrics set to a certain color (such as green) for their display by the user interface. The monitor further determines a variation trend of the values of each predominant metric over time (for example, defined by their gradient in the last 2-8 values); as soon as the variation trend becomes (possible higher) than a variation threshold, the monitor switches the predominant metric to another color (such as red). This helps the system administrator in selecting the adjusting metric.

The monitor at block 540 retrieves a historical set of values of the adjusting metric and of the objective indicator of the critical service domain from the metric repository. The values of the historical set are the last ones that have been collected over a historical period (for example, longer than the modeling period, such as in the last year). The monitor at block 542 determines one or more candidate values of the adjusting metric within the historical set. The candidate values are the ones for which the corresponding values of the objective indicator are not critical (i.e., they do not reach the corresponding objective threshold). For example, the monitor calculates a distribution for the values of the objective indicator that are not critical (by splitting their ordered sequence into a predefined number of adjacent, non-overlapping ranges and then assigning each range to an average value of the corresponding values of the objective indicator), and it associates each range with an average of the corresponding values of the adjusting metric (or vice-versa). Continuing to block 544, the monitor updates the monitoring dashboard accordingly and the user interface then refreshes it to display an indication of the candidate values of the adjusting metric (for example, with a graphical representation of the corresponding distribution in a pop-up window). The user interface at block 546 prompts the system administrator to enter a proposed value of the adjusting metric (for example, by typing it into an input box). The display of the candidate values significantly simplifies the choice of the proposed value, since the system administrator is informed about the values of the adjusting metric that have provided a correct operation of the service domain in the past, and then are likely to do the same in the future. The user interface then updates the adjustment repository accordingly.

With reference now to block 548, a simulation version of the regression functions is defined. The simulation version of the regression functions is the last one that has been determined. Moreover, a simulation set of values of the collection metrics is defined, where the values of the simulation set are the last ones that have been collected over a simulation period (such as equal to the collection period, i.e., in the last month). The estimator and the matcher then retrieve the simulation version of the regression functions from the corresponding repository. Moreover, the modeler retrieves the values of all the predominant metrics (as indicated in the simulation version of the regression functions) in the simulation set and the estimator retrieves the last value of the other predominant metrics of the critical service domain (different from the adjusting metric) in the simulation set from the metric repository. The estimator at block 550 calculates the estimated value of the objective indicator of the critical service domain, by applying the simulation version of its regression function (with its accuracy indicator) to the proposed value of the adjusting metric (retrieved from the corresponding repository) and to the last value of the other predominant metrics of the critical service domain in the simulation set. The estimator calculates the estimated variation (in percentage) of the objective indicator from its last value in the simulation set to the estimated value. The estimator then updates the estimation repository accordingly. The modeler at block 552 determines a new version of the correlation matrix. For example, the modeler calculates the correlation coefficient between the adjusting metric and each other predominant metric of all the service domains, according to their values in the simulation set. The modeler then updates the correlation matrix repository accordingly. The correlator at block 554 determines any impacted metrics corresponding to the adjusting metric, and it updates the corresponding repository accordingly. For example, the impacted metrics are the ones whose correlation coefficient with the adjusting metric is (possibly strictly) higher in absolute value than a correlation threshold, such as 0.7 (as indicated in the correlation matrix repository). The flow of activity branches at block 556 according to the type of the adjusting metric (as indicated in the configuration repository). If the adjusting metric is a cross-domain metric, the correlator at block 558 adds the adjusting metric itself to the impacted metrics by updating the corresponding repository accordingly. The process then descends into block 560. The same point is also reached directly from block 556 if the adjusting metric is an intra-domain metric.

At this point, a loop is entered wherein the matcher than takes another (current) service domain (different from the critical service domain) into account, starting from a first one in any arbitrary order (as indicated in the regression function repository). The matcher at block 562 verifies the impacted metrics (as indicated in the corresponding repository) against the predominant metrics of the service domain (as indicated in the simulation version of its regression function). If any impacted metric is comprised in the predominant metrics of the service domain, the matcher at block 564 determines the service domain as an impacted service domain, and it updates the corresponding repository accordingly. The process then continues to block 566. The same point is also reached directly from block 562 if no impacted metric is comprised in the predominant metrics of the service domain. A test is now made, wherein the matcher verifies whether a last service domain has been taken into account. If not, the flow of activity returns to block 560 to repeat the same operations on a next service domain. Conversely (once all the service domains have been taken into account), the loop is exited descending into block 568. At this point, the simulator generates a new version of the simulation dashboard (according to the estimated variation of the objective indicator of the critical service domain and to the impacted service domains with their impacted metrics) in the corresponding repository, and the user interface displays it on the monitor of the workstation.

With reference now to block 570, the system administrator may decide to extend the simulation over time (for example, by selecting a corresponding command of the user interface). If so, the user interface at block 572 prompts the system administrator to select a simulation time in the past, within a range for which values of the collection metrics are available in a number being statistically significant in the corresponding repository (for example, with a slider in the last 11 months). With reference now to block 574, the corresponding simulation version of the regression functions is defined. The simulation version of the regression functions is the last one that has been determined before the simulation time. Moreover, the corresponding simulation set of values of the collection metrics is defined. The values of the simulation set are the last ones that have been collected over the simulation period before the simulation time. As above, the estimator and the matcher retrieve the simulation version of the regression functions from the corresponding repository. Moreover, the modeler retrieves the values of all the predominant metrics in the simulation set and the estimator retrieves the last value of the predominant metrics of the critical service domain different from the adjusting metric in the simulation set from the metric repository. The process then returns to block 550 to repeat the same operations with reference to the simulation time. As a result, the corresponding version of the simulation dashboard that is displayed allows the system administrator to verify the effect of the correction action corresponding to the proposed value of the adjusting metric in different situations. The above-described functionality may be useful when the current value of the accuracy indicator is too low; in this way, it is possible to simulate the effect of the correction action when the accuracy indicator is higher. Moreover, the same functionality may be useful when the operative conditions of the mainframe vary significantly over time; in this way, it is possible to estimate the effect of the correction action in the future (from corresponding operative conditions in the past).

Referring back to block 570, if the system administrator decides not to (further) extend the simulation over time, the process descends into block 576. The flow of activity now branches according to a decision of the system administrator about continuing the simulation (for example, by selecting corresponding commands of the user interface). If the user decides to continue the simulation (with a different adjusting metric and/or proposed value thereof), the process returns to block 538 to repeat the same operations (apart from retrieving the simulation set of values and determining the correlation matrix if not necessary). Conversely, as soon as the system administrator decides to end the simulation, the process descends into block 578.

At this point, the system administrator may act according to the simulation, in an attempt to restore the correct operation of the critical service domain (without adversely affecting the other service domains). For this purpose, the system administrator changes a (selected) adjusting metric to a (selected) proposed value (for example, by submitting a corresponding command to the middleware implementing the critical service domain). With reference now to block 580, the system administrator may decide to refresh the monitoring dashboard immediately (for example, by selecting a corresponding command of the user interface). If so, the user interface at block 582 forces the collection of the current values of the collection metrics and of the objective indicator for the critical service domain (as at block 512), the determination of a new version of the regression function for the critical service domain (as at block 528) and the update of the monitoring dashboard (as at block 530). This allows verifying the actual effect of the correction action in real-time. The process then returns to block 536 waiting for the detection of any other further critical condition; the same point is also reached directly from block 580 if the system administrator decides not to refresh the monitoring dashboard.

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a target computing system. However, the target computing system may be of any type (for example, a mainframe, a supercomputer, a LAN and so on).

In an embodiment, the target computing system is configured to run a plurality of service domains. However, the service domains may be in any number and of any type (for example, based on any operating system, any middlewares, logical/physical partitions, and so on).

In an embodiment, the method comprises the following steps that are executed by a control computing system. The control computing system may be of any type (see below).

In an embodiment, the method comprises collecting (by the control computing system) one or more current values of at least one objective indicator and of one or more collection metrics of each of the service domains. The collection metrics and the objective indicator may be in any number and of any type (partial, different or additional ones with respect to above), and they may be collected in any way (for example, by interacting in any way with any number and type of monitoring tools) and with any timing (for example, continually, in response to a critical condition, on-demand and so on).

In an embodiment, the method comprises determining (by the control computing system) one or more current versions of a statistical regression of each service domain. The statistical regression may be of any type (for example, a regression function, a regression rule, a trained neural network and so on) and it may be determined in any way (for example, with techniques of statistical analysis, rule induction, machine learning and so) and with any timing (either the same or different with respect to the collection of the collection metrics and of the objective indicators).

In an embodiment, the statistical regression of each service domain is between the objective indicator and one or more predominant metrics (among the collection metrics) that are predominant in affecting the objective indicator. The predominant metrics may be in any number and they may be determined in any way (for example, set to the ones defining the statistical regression, by selecting the most relevant ones in the statistical regression after its determination and so on).

In an embodiment, each current version of the statistical regression of each service domain is determined according to a regression set of the current values of the collection metrics and of the objective indicator of the service domain. The regression set may be of any type (for example, defined by the values collected after a last determination of the statistical regression, the values collected in a last predefined period, all the collected values, in any case as is or weighted according to their age, and so on).

In an embodiment, the method comprises outputting (by the control computing system) an indication of the current values of the objective indicator and of the current versions of the predominant metrics of each service domain. This information may be output in any way (for example, displayed on a monitor, printed, sent over a network and so on).

In an embodiment, the output information is for use in acting on at least one adjusting metric (among the predominant metrics) of a critical service domain (among the service domains). Anyone (for example, a system administrator of the critical service domain, a system administrator of the whole target computing system, an expert system and so on) may act on any number of adjusting metrics in any way (for example, by changing one or more operative parameters, by provisioning one or more hardware/software resources and so on).

In an embodiment, the critical service domain has at least one of the current values of the corresponding objective indicator that is critical. The critical service domain may be determined in any way (for example, as soon as the current value of the objective indicator reaches any objective threshold, any objective function based on any number of objective indicators reaches another objective threshold, this happens a predefined number of times consecutively or over a predefined period, and so on).

In an embodiment, the method comprises collecting (by the control computing system) the current values of the objective indicator and of the collection metrics of each service domain continually over time. This operation may be repeated over time in any way (for example, every predefined time, number of transactions, number of processing cycles and so on).

In an embodiment, the method comprises determining (by the control computing system) the current versions of the statistical regression of each service domain continually over time. This operation may be repeated over time in any way (either the same or different with respect to above).

In an embodiment, the method comprises displaying (by the control computing system) the indication of the current values of the objective indicator and of the current versions of the predominant metrics of each service domain in a dynamic dashboard. The dashboard may be of any type (for example, a tabbed pane, a window, a frame, with widgets, graphs, tables, with or without different colors of the objective indicators according to their values, with or without different colors of the predominant metrics according to their variation trend and so on).

In an embodiment, the method comprises collecting (by the control computing system) the current values of the objective indicator and of the collection metrics of each service domain with a collection period. The collection period may have any value (predefined, customizable, variable dynamically according to any factors and so on).

In an embodiment, the method comprises determining (by the control computing system) the current versions of the statistical regression of each service domain with a modeling period strictly higher than the collection period. The modeling period may have any value (either in absolute or in relative terms).

In an embodiment, the method comprises executing (by the control computing system) said collecting a new one of the current values of the objective indicator and of the collection metrics of the critical service domain, said determining a new one of the current versions of the statistical regression of the critical service domain, and said outputting the indication of the new current value of the objective indicator and of the new current version of the predominant metrics of the critical service domain in response to said acting on the adjusting metric. This operation may be performed in any way (for example, on-demand, automatically, completely or only for refreshing the value of the objective indicator, and so on), or it may be omitted.

In an embodiment, the method comprises determining (by the control computing system) each of the current versions of the statistical regression of each service domain as a linear regression expressing the objective indicator as a regression function of the predominant metrics and of corresponding regression parameters, the regression function being linear in the regression parameters. The regression function may be of any type (for example, either linear or not in the predominant metrics, and so on), and it may also be not linear.

In an embodiment, the method comprises determining (by the control computing system) corresponding current values of an accuracy indicator of the current versions of the statistical regression of each service domain. The accuracy indicator may be of any type (for example, R-squared coefficient, relative error and so on), or its determination may be omitted.

In an embodiment, each of the current values of the accuracy indicator of each service domain is determined according to the corresponding regression set of the current values of the collection metrics and of the objective indicator of the service domain. The accuracy indicator may be determined in any way (for example, together with the determination of the statistical regression, by testing the statistical regression after its determination and so on).

In an embodiment, the method comprises outputting (by the control computing system) an indication of the current values of the accuracy indicator of each service domain. The accuracy indicator may be output in any way (for example, as a number, a percentage, a graph, a qualitative indicator and so on), in the monitoring dashboard and/or the simulation dashboard, or this feature may be omitted.

In an embodiment, the method comprises receiving (by the control computing system) an indication of a proposed value of the adjusting metric. The proposed value may be provided in any way (for example, entering its value, acting on a graphical element and so on).

In an embodiment, the method comprises calculating (by the control computing system) an estimated value of the objective indicator of the critical service domain according to a last one of the current versions of the corresponding statistical regression applied to the proposed value of the adjusting metric and to a last one of the current values of the other predominant metrics different from the adjusting metric of the critical service domain. The estimated value may be calculated in any way (for example, with or without its accuracy indicator, according to the last piece of information that is available or to more of them possibly weighted according to their age, and so on).

In an embodiment, the method comprises outputting (by the control computing system) an indication of the estimated value of the objective indicator of the critical service domain. This information may be output in any way (for example, displayed on a monitor, printed, sent over a network and so on) and in any form (for example, in absolute terms, as its variation with respect to the corresponding current value, in numerical form, in graphical form and so on). In any case, this functionality may be omitted in a basic implementation.

In an embodiment, the method comprises the following steps when the adjusting metric is relevant to one or more other service domains different from the critical service domain. This functionality may be omitted in a basic implementation.

In an embodiment, these steps comprise determining (by the control computing system) one or more impacted service domains among the other service domains, each of the impacted service domains comprising the adjusting metric among the corresponding predominant metrics. Each impacted service domain may be determined in any way according to the adjusting metric (for example, when it is comprised in its predominant metrics, when it affects its objective indicator above a predefined threshold and so on) with reference to any time (for example, at the moment, at any simulation time in the past and so on).

In an embodiment, these steps comprise outputting (by the control computing system) an indication of the impacted service domains. This information may be output in any way (for example, displayed on a monitor, printed, sent over a network and so on) and in any form (for example, by the names of the impacted service domains with or without additional information, such as the adjusting metric, a measure of the effect of the adjusting metric on the objective indicator and so on).

In an embodiment, a method comprises determining (by the control computing system) corresponding statistical correlations between the adjusting metric and each of the other predominant metrics different from the adjusting metric. The statistical correlations may be of any type (for example, a matrix, a table and the like, defined by any correlation coefficient, such as the Pearson's coefficient, the intra-class coefficient, the rank coefficient, the mutual information and the like or any combination thereof, and so on).

In an embodiment, the statistical correlations are determined according to a simulation set of the current values of the predominant metrics. The statistical correlations may be determined in any way (either the same or different with respect to the determination of the statistical regressions), at any time (for example, whatever a critical condition is detected, whatever a simulation is requested, indiscriminately together with the determination of the statistical regressions for all the pairs of collecting metrics, and so on), and according to any simulation set (either the same or different with respect to the regression set).

In an embodiment, the method comprises determining (by the control computing system) one or more impacted service domains among the other service domains different from the critical service domain according to the statistical correlations between the adjusting metric and the corresponding predominant metrics. The impacted metrics may be determined in any way (for example, with or without determining impacted metrics corresponding to the adjusting metric, such as by determining the impacted service domains directly in response to any function of the correlation coefficients of its predominant metrics with the adjusting metric, all of them or only of the ones whose correlation coefficients reach a threshold, and so on).

In an embodiment, the method comprises outputting (by the control computing system) an indication of the impacted service domains. This information may be output in any way and in any form (either the same or different with respect to above), or this functionality may be omitted in a basic implementation.

In an embodiment, the method comprises determining (by the control computing system) one or more impacted metrics among the other predominant metrics being impacted by the adjusting metric according to the corresponding statistical correlations. Each impacted metric may be determined in any way (for example, when a single correlation coefficient thereof or any formula based on multiple correlation coefficients thereof reaches any correlation threshold, and so on).

In an embodiment, the method comprises determining (by the control computing system) the impacted service domains in response to comprising at least one of the impacted metrics among the corresponding predominant metrics. The impacted service domains may be determined in any way according to the impacted metrics (either the same or different with respect to their determination according to the adjusting metric).

In an embodiment, the method comprises receiving (by the control computing system) an indication of a simulation time. The simulation time may be of any type (for example, a single instant or instants repeating periodically over a range) and it may be provided in any way (for example, entering its value, acting on a graphical element and so on).

In an embodiment, the method comprises calculating (by the control computing system) a further estimated value of the objective indicator of the critical service domain according to one of the current versions of the corresponding statistical regression corresponding to the simulation time applied to the proposed value of the adjusting metric and to one of the current values of the other metrics of the critical service domain corresponding to the simulation time. The further estimated value may be calculated in any way (either the same or different with respect to the estimated value).

In an embodiment, the method comprises outputting (by the control computing system) an indication of the further estimated value of the objective indicator of the critical service domain. This information may be output in any way and in any form (either the same or different with respect to the estimated value); in any case, this functionality may be omitted in a basic implementation.

In an embodiment, the method comprises determining (by the control computing system) corresponding further statistical correlations between the adjusting metric and each of the other predominant metrics different from the adjusting metric. The further statistical correlations may be of any type (either the same or different with respect to the statistical correlations).

In an embodiment, the further statistical correlations are determined according to a further simulation set of the current values of the predominant metrics corresponding to the simulation time. The further statistical correlations may be determined in any way, at any time and according to any further simulation set (either the same or different with respect to the statistical correlations).

In an embodiment, the method comprises determining (by the control computing system) one or more further impacted service domains among the other service domains different from the critical service domain according to the further statistical correlations between the adjusting metric and the corresponding predominant metrics. The further impacted metrics may be determined in any way (either the same or different with respect to the impacted service domains).

In an embodiment, the method comprises outputting (by the control computing system) an indication of the further impacted service domains. This information may be output in any way and in any form (either the same or different with respect to impacted metrics), or this functionality may be omitted in a basic implementation.

In an embodiment, the method comprises determining (by the control computing system) one or more candidate values of the adjusting metric within a historical set of the current values of the adjusting metric for which the corresponding current values of the objective indicator of the critical service domain are not critical. The candidate values may be determined in any way (for example, according to any distribution of the values of the objective indicator or of the adjusting metric, by simply taking into account all the values of the adjusting metric that have made the values of the objective indicator not critical and so on) and according to any historical set.

In an embodiment, the method comprises outputting (by the control computing system) an indication of the candidate values of the adjusting metric. This information may be output in any way (for example, displayed on a monitor, printed, sent over a network and so on) and in any form (for example, with or without additional information, such as corresponding (mean) values of the objective indicator, their frequency, and so on); in any case, this functionality may be omitted in a basic implementation.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a control computing system to perform the above-mentioned method. An embodiment provides a computer program product for managing a target computing system configured to run a plurality of service domains. The computer program product comprises a computer readable storage medium that has program instructions embodied therewith. The program instructions are executable by a control computing system to cause the control computing system to perform the above-mentioned method. The computer program may be implemented as a stand-alone module, as a plug-in for a pre-existing software program (for example, a monitoring application) or directly therein. Moreover, the computer program may be executed on any control computing system (see below). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. The system may be of any type (for example, a dedicated control computing system, such as a workstation, a desktop, a laptop, a tablet, a smartphone and the like, a server offering a corresponding service, such as a physical machine, a virtual machine, a cloud service and the like, the target computing system itself and the like); when necessary, the control computing system and the target computing system may communicate over any network (for example, a global network, a wide area network, a local area network and so on) using any kind of connections (for example, wired or wireless connections, telephone connections, satellite connections and so on).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
identifying, by a control computing system, a target computing system configured to operate in a plurality of service domains; and
for a first service domain of the plurality of service domains:
determining, by the control computing system, one or more predominant metrics from a set of metrics associated with the first service domain, based, at least in part, on a statistical regression between current values of a metric indicating success and one or more other metrics, the one or more predominant metrics being predominant in affecting the metric indicating success,
in response to an indication that the current value of the metric indicating success is critical, determining, by the control computing system, an adjusted value of an adjusting metric of the one or more predominant metrics based, at least in part, on the statistical regression;

determining, by the control computing system, that the adjusting metric as determined with respect to the first service domain is relevant to a second service domain different from the first service domain by:
analyzing one or more predominant metrics of the second service domain to identify one or more impacted metrics of the one or more predominant metrics of the second service domain, wherein the one or more impacted metrics are metrics for which a correlation coefficient of the adjusting metric exceeds a threshold; and
outputting, by the control computing system, an indication of the adjusted value of the adjusting metric to: (i) a first system administrator of the first service domain, and (ii) a second system administrator of the second service domain different from the first system administrator of the first service domain.

2. The computer-implemented method of claim 1, wherein the determining of the adjusted value of the adjusting metric comprises:
receiving, by the control computing system, for the first service domain having the current value of the metric indicating success that is critical, an indication of a proposed adjusted value of the adjusting metric of the one or more predominant metrics.

3. The computer-implemented method of claim 2, wherein the determining of the adjusted value of the adjusting metric further comprises:
calculating, by the control computing system, an estimated value of the metric indicating success of the first service domain by applying the statistical regression to the proposed adjusted value of the adjusting metric.

4. The computer-implemented method of claim 3, wherein the determining of the adjusted value of the adjusting metric further comprises:
determining, by the control computing system, the proposed adjusted value of the adjusting metric is the adjusted value of the adjusting metric based, at least in part, on the estimated value of the metric indicating success of the first service domain not being critical.

5. The computer-implemented method of claim 4, further comprising:
applying, by the control computing system, the adjusted value of the adjusting metric to the first service domain;
collecting, by the control computing system, new current values of: (i) the metric indicating success of the first service domain, and (ii) the one or more other metrics of the first service domain;
determining, by the control computing system, one or more new predominant metrics of the first service domain from the one or more other metrics, based, at least in part, on a new statistical regression between the metric indicating success of the first service domain and the one or more other metrics of the first service domain, the one or more new predominant metrics of the first service domain being predominant in affecting the metric indicating success of the first service domain; and
outputting, by the control computing system, an indication of the new current value of the metric indicating success of the first service domain and the one or more new predominant metrics of the first service domain.

6. The computer-implemented method of claim 1, further comprising:
determining, by the control computing system, one or more candidate values of a predominant metric of the one or more predominant metrics, the one or more candidate values being within a historical set of values for which the corresponding current values of the metric indicating success are not critical; and
outputting, by the control computing system, an indication of the one or more candidate values.

7. A computer program product comprising a computer readable storage medium having program instructions embodied therewith, the program instructions executable by a control computing system to cause the control computing system to perform a method comprising:
identifying a target computing system configured to operate in a plurality of service domains; and
for a first service domain of the plurality of service domains:
determining, by the control computing system, one or more predominant metrics from one or more other collection metrics, based, at least in part, on a statistical regression between current values of a metric indicating success and one or more other collection metrics, the one or more predominant metrics being predominant in affecting the metric indicating success,
in response to an indication that the current value of the metric indicating success is critical, determining, by the control computing system, an adjusted value of an adjusting metric of the one or more predominant metrics based, at least in part, on the statistical regression;
determining, by the control computing system, that the adjusting metric as determined with respect to the first service domain is relevant to a second service domain different from the first service domain by:
analyzing one or more predominant metrics of the second service domain to identify one or more impacted metrics of the one or more predominant metrics of the second service domain, wherein the one or more impacted metrics are metrics for which a correlation coefficient of the adjusting metric exceeds a threshold; and
outputting, by the control computing system, an indication of the adjusted value of the adjusting metric to: (i) a first system administrator of the first service domain, and (ii) a second system administrator of the second service domain different from the first system administrator of the first service domain.

8. The computer program product of claim 7, wherein the determining of the adjusted value of the adjusting metric comprises:
receiving, by the control computing system, for the first service domain having the current value of the metric indicating success that is critical, an indication of a proposed adjusted value of the adjusting metric of the one or more predominant metrics.

9. The computer program product of claim 8, wherein the determining of the adjusted value of the adjusting metric further comprises:
calculating, by the control computing system, an estimated value of the metric indicating success of the first service domain by applying the statistical regression to the proposed adjusted value of the adjusting metric.

10. The computer program product of claim 9, wherein the determining of the adjusted value of the adjusting metric further comprises:
determining, by the control computing system, the proposed adjusted value of the adjusting metric is the adjusted value of the adjusting metric based, at least in part, on the estimated value of the metric indicating success of the first service domain not being critical.

11. The computer-program product of claim 10, wherein the method further comprises:
applying, by the control computing system, the adjusted value of the adjusting metric to the first service domain
collecting, by the control computing system, new current values of: (i) the metric indicating success of the first service domain, and (ii) the one or more other metrics of the first service domain;
determining, by the control computing system, one or more new predominant metrics of the first service domain from the one or more other metrics, based, at least in part, on a new statistical regression between the metric indicating success of the first service domain and the one or more other metrics of the first service domain, the one or more new predominant metrics of the first service domain being predominant in affecting the metric indicating success of the first service domain; and
outputting, by the control computing system, an indication of the new current value of the metric indicating success of the first service domain and the one or more new predominant metrics of the first service domain.

12. The computer program product of claim 7, wherein the method further comprises:
determining one or more candidate values of a predominant metric of the one or more predominant metrics, the one or more candidate values being within a historical set of values for which the corresponding current values of the metric indicating success are not critical; and
outputting an indication of the one or more candidate values.

13. A computer system comprising:
one or more computer processors; and
a computer readable storage medium;
wherein:
the one or more computer processors are structured, located, connected, and/or programmed to execute program instructions stored on the computer readable storage medium, and
the program instructions, when executed by the one or more computer processors, cause the one or more processors to perform a method comprising:
identifying a target computing system configured to operate in a plurality of service domains; and
for a first service domain of the plurality of service domains:
determining, by the control computing system, one or more predominant metrics from one or more other collection metrics, based, at least in part, on a statistical regression between current values of a metric indicating success and one or more other collection metrics, the one or more predominant metrics being predominant in affecting the metric indicating success,
in response to an indication that the current value of the metric indicating success is critical, determining, by the control computing system, an adjusted value of an adjusting metric of the one or more predominant metrics based, at least in part, on the statistical regression;
determining, by the control computing system, that the adjusting metric as determined with respect to the first service domain is relevant to a second service domain different from the first service domain by:
analyzing one or more predominant metrics of the second service domain to identify one or more impacted metrics of the one or more predominant metrics of the second service domain, wherein the one or more impacted metrics are metrics for which a correlation coefficient of the adjusting metric exceeds a threshold; and
outputting, by the control computing system, an indication of the adjusted value of the adjusting metric to: (i) a first system administrator of the first service domain, and (ii) a second system administrator of the second service domain different from the first system administrator of the first service domain.

14. The computer system of claim 13, wherein the determining of the adjusted value of the adjusting metric comprises:
receiving, by the control computing system, for the first service domain having the current value of the metric indicating success that is critical, an indication of a proposed adjusted value of the adjusting metric of the one or more predominant metrics.

15. The computer system of claim 14, wherein the determining of the adjusted value of the adjusting metric further comprises:
calculating, by the control computing system, an estimated value of the metric indicating success of the first service domain by applying the statistical regression to the proposed adjusted value of the adjusting metric.

16. The computer system of claim 15, wherein the determining of the adjusted value of the adjusting metric further comprises:
determining, by the control computing system, the proposed adjusted value of the adjusting metric is the adjusted value of the adjusting metric based, at least in part, on the estimated value of the metric indicating success of the first service domain not being critical.

17. The computer system of claim 16, wherein the method further comprises:
applying, by the control computing system, the adjusted value of the adjusting metric to the first service domain
collecting, by the control computing system, new current values of: (i) the metric indicating success of the first service domain, and (ii) the one or more other metrics of the first service domain;
determining, by the control computing system, one or more new predominant metrics of the first service domain from the one or more other metrics, based, at least in part, on a new statistical regression between the metric indicating success of the first service domain and the one or more other metrics of the first service domain, the one or more new predominant metrics of the first service domain being predominant in affecting the metric indicating success of the first service domain; and
outputting, by the control computing system, an indication of the new current value of the metric indicating success of the first service domain and the one or more new predominant metrics of the first service domain.

* * * * *